US009677774B2

(12) United States Patent
McKee et al.

(10) Patent No.: US 9,677,774 B2
(45) Date of Patent: *Jun. 13, 2017

(54) MULTI-ZONE OVEN WITH VARIABLE CAVITY SIZES

(71) Applicant: ALTO-SHAAM, INC., Menomonee Falls, WI (US)

(72) Inventors: Philip R. McKee, Frisco, TX (US); Lee Thomas VanLanen, McKinney, TX (US); Todd Coleman, Farmers Branch, TX (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/733,533

(22) Filed: Jun. 8, 2015

(65) Prior Publication Data

US 2016/0356505 A1 Dec. 8, 2016

(51) Int. Cl.
*F24C 15/32* (2006.01)
*A21B 1/26* (2006.01)
(Continued)

(52) U.S. Cl.
CPC .............. *F24C 15/322* (2013.01); *A21B 1/26* (2013.01); *F24C 15/16* (2013.01); *F24C 15/00* (2013.01); *F24C 15/007* (2013.01)

(58) Field of Classification Search
CPC ........ F24C 15/00; F24C 15/322; F24C 15/16; F24C 15/32
(Continued)

(56) References Cited

U.S. PATENT DOCUMENTS 1,527,020 A   2/1925   Valliant
2,098,295 A  11/1937   Kettering et al.
(Continued)

FOREIGN PATENT DOCUMENTS

CN   202066327 U   12/2011
EP     0002784 A1    7/1979
(Continued)

OTHER PUBLICATIONS

International Search Report for PCT/US2016/030718 dated Jul. 27, 2016.
(Continued)

*Primary Examiner* — Gregory Huson
*Assistant Examiner* — Nikhil Mashruwala
(74) *Attorney, Agent, or Firm* — Boyle Fredrickson, S.C.

(57) ABSTRACT

A convection oven is disclosed. The convection oven comprises a housing having an oven cavity and an oven door for access to the oven cavity, at least one air blower for generating heated air, one or more air channels for directing the heated air from the air blower toward the oven cavity, and one or more removable air plenums, wherein each removable air plenum is connected to one of the one or more air channels, comprises an air intake edge for receiving the heated air from the air channel, defines the top or the bottom of a cooking chamber within the oven cavity, and comprises a plurality of air vents for directing the heated air into the cooking chamber. The convection oven may further comprise a control panel for separately and independently controlling each of the cooking chambers defined by the removable air plenums.

21 Claims, 7 Drawing Sheets

(51) Int. Cl.
F24C 15/16 (2006.01)
F24C 15/00 (2006.01)

(58) Field of Classification Search
USPC ............... 126/21 A, 19 A; 219/400, 403
See application file for complete search history.

(56) References Cited

U.S. PATENT DOCUMENTS

| | | |
|---|---|---|
| 2,214,630 A | 9/1940 | Wheeler |
| 2,305,056 A | 12/1942 | Austin |
| 2,491,687 A | 12/1949 | Nutt |
| 2,513,846 A | 7/1950 | Collins |
| 2,683,795 A | 7/1954 | Sheidler |
| 2,715,898 A | 8/1955 | Michaelis et al. |
| 2,940,381 A | 6/1960 | Cottongim et al. |
| 3,221,729 A | 12/1965 | Beasley et al. |
| 3,232,072 A | 2/1966 | Barroero |
| 3,304,406 A | 2/1967 | King |
| 3,326,201 A | 6/1967 | Murray |
| 3,335,499 A | 8/1967 | Larsson |
| 3,514,576 A | 5/1970 | Hilton et al. |
| 3,538,904 A | 11/1970 | Baker |
| 3,568,590 A | 3/1971 | Grice |
| 3,658,047 A | 4/1972 | Happel |
| 3,674,982 A | 7/1972 | Hoyt |
| 3,694,782 A * | 9/1972 | Ray .................... H01F 7/145 |
| | | 335/230 |
| 3,789,516 A | 2/1974 | Schraft et al. |
| 3,828,760 A | 8/1974 | Farber et al. |
| 3,884,213 A | 5/1975 | Smith |
| 3,908,533 A | 9/1975 | Fagerstrom et al. |
| 3,935,809 A | 2/1976 | Bauer |
| 3,946,651 A | 3/1976 | Garcia |
| 4,038,968 A | 8/1977 | Rovell |
| 4,110,916 A | 9/1978 | Bemrose |
| 4,154,861 A | 5/1979 | Smith |
| 4,162,141 A | 7/1979 | West |
| 4,189,995 A | 2/1980 | Lohr et al. |
| 4,307,286 A | 12/1981 | Guibert |
| 4,307,659 A * | 12/1981 | Martin .................... A47J 37/06 |
| | | 99/444 |
| 4,313,485 A | 2/1982 | Gidge et al. |
| 4,323,110 A | 4/1982 | Rubbright et al. |
| 4,326,342 A | 4/1982 | Schregenberger |
| 4,338,911 A | 7/1982 | Smith |
| 4,354,549 A | 10/1982 | Smith |
| 4,366,177 A | 12/1982 | Wells et al. |
| 4,374,319 A | 2/1983 | Guibert |
| 4,377,109 A | 3/1983 | Brown et al. |
| 4,381,442 A | 4/1983 | Guibert |
| 4,389,562 A | 6/1983 | Chaudoir |
| 4,395,233 A | 7/1983 | Smith et al. |
| 4,397,299 A | 8/1983 | Taylor et al. |
| 4,404,898 A | 9/1983 | Chaudoir |
| 4,455,478 A | 6/1984 | Guibert |
| 4,462,383 A | 7/1984 | Henke et al. |
| 4,471,750 A | 9/1984 | Burtea |
| 4,472,887 A | 9/1984 | Avedian et al. |
| 4,474,498 A | 10/1984 | Smith |
| 4,479,776 A | 10/1984 | Smith |
| 4,484,561 A | 11/1984 | Baggott et al. |
| 4,492,839 A | 1/1985 | Smith |
| 4,515,143 A | 5/1985 | Jabas |
| 4,516,012 A | 5/1985 | Smith et al. |
| 4,601,237 A | 7/1986 | Harter et al. |
| 4,605,038 A | 8/1986 | Tchitdjian |
| 4,625,867 A | 12/1986 | Guibert |
| 4,626,661 A | 12/1986 | Henke |
| 4,631,029 A | 12/1986 | Lanham et al. |
| 4,690,127 A | 9/1987 | Sank |
| 4,700,619 A | 10/1987 | Scanlon |
| 4,714,050 A | 12/1987 | Nichols |
| 4,722,683 A | 2/1988 | Royer |
| 4,727,853 A | 3/1988 | Stephen et al. |
| 4,739,154 A | 4/1988 | Bharara et al. |
| 4,750,276 A | 6/1988 | Smith et al. |
| 4,757,800 A | 7/1988 | Shei et al. |
| 4,822,981 A | 4/1989 | Chaudoir |
| 4,829,158 A * | 5/1989 | Burnham .............. F24C 15/325 |
| | | 126/21 A |
| 4,829,982 A | 5/1989 | Abidor |
| 4,835,351 A | 5/1989 | Smith et al. |
| 4,865,864 A | 9/1989 | Rijswijck |
| 4,867,132 A | 9/1989 | Yencha |
| 4,870,254 A | 9/1989 | Arabori |
| 4,876,426 A | 10/1989 | Smith |
| 4,892,030 A | 1/1990 | Grieve |
| 4,895,137 A | 1/1990 | Jones et al. |
| 4,928,663 A | 5/1990 | Nevin et al. |
| 4,951,645 A | 8/1990 | Luebke et al. |
| 4,960,977 A | 10/1990 | Alden |
| 4,965,435 A | 10/1990 | Smith et al. |
| 4,981,416 A | 1/1991 | Nevin et al. |
| 4,994,181 A | 2/1991 | Mullaney, Jr. |
| 5,025,775 A * | 6/1991 | Crisp ..................... A21B 1/48 |
| | | 126/21 A |
| 5,050,578 A | 9/1991 | Luebke et al. |
| 5,121,737 A | 6/1992 | Yencha, III |
| 5,172,682 A | 12/1992 | Luebke et al. |
| 5,180,898 A | 1/1993 | Alden et al. |
| 5,211,106 A | 5/1993 | Lucke |
| 5,222,474 A | 6/1993 | Yencha, III |
| 5,223,290 A | 6/1993 | Alden |
| 5,228,385 A * | 7/1993 | Friedrich ................ A21B 1/26 |
| | | 126/21 A |
| 5,231,920 A | 8/1993 | Alden et al. |
| 5,254,823 A | 10/1993 | McKee et al. |
| 5,272,317 A | 12/1993 | Ryu |
| 5,299,557 A * | 4/1994 | Braithwaite ........ F24C 15/2042 |
| | | 126/299 R |
| 5,309,981 A | 5/1994 | Binder |
| 5,345,923 A | 9/1994 | Luebke et al. |
| 5,361,749 A | 11/1994 | Smith et al. |
| 5,365,039 A | 11/1994 | Chaudoir |
| 5,404,935 A | 4/1995 | Liebermann |
| 5,421,316 A | 6/1995 | Heber |
| 5,421,317 A | 6/1995 | Cole et al. |
| 5,434,390 A | 7/1995 | McKee et al. |
| 5,454,295 A | 10/1995 | Cox et al. |
| 5,458,051 A | 10/1995 | Alden et al. |
| 5,460,157 A | 10/1995 | Prabhu |
| 5,483,044 A | 1/1996 | Thorneywork et al. |
| 5,492,055 A | 2/1996 | Nevin et al. |
| 5,497,760 A | 3/1996 | Alden et al. |
| 5,507,382 A | 4/1996 | Hartwell et al. |
| 5,520,095 A | 5/1996 | Huber et al. |
| 5,530,223 A | 6/1996 | Culzoni et al. |
| 5,558,793 A | 9/1996 | McKee et al. |
| 5,572,984 A | 11/1996 | Alden et al. |
| 5,577,438 A | 11/1996 | Amitrano et al. |
| 5,582,093 A | 12/1996 | Amitrano et al. |
| 5,620,731 A | 4/1997 | McKee |
| 5,647,740 A | 7/1997 | Kobaru |
| 5,655,511 A | 8/1997 | Prabhu et al. |
| 5,676,044 A | 10/1997 | Lara, Jr. |
| 5,683,240 A | 11/1997 | Smith et al. |
| 5,720,273 A | 2/1998 | Trullas |
| 5,747,775 A | 5/1998 | Tsukamoto et al. |
| 5,847,365 A | 12/1998 | Harter et al. |
| 5,880,436 A | 3/1999 | Keogh |
| 5,908,574 A | 6/1999 | Keogh |
| 5,927,265 A | 7/1999 | McKee et al. |
| 5,928,072 A | 7/1999 | Fulcher et al. |
| 5,928,541 A | 7/1999 | Tsukamoto et al. |
| 5,934,178 A | 8/1999 | Caridis et al. |
| 5,934,182 A | 8/1999 | Harter et al. |
| 5,938,959 A * | 8/1999 | Wang .................. A47J 37/0623 |
| | | 126/20 |
| 5,941,235 A | 8/1999 | Carter |
| 5,951,901 A | 9/1999 | Douglas et al. |
| 5,954,986 A | 9/1999 | Tsukamoto et al. |
| 5,988,154 A | 11/1999 | Douglas et al. |
| 5,990,466 A | 11/1999 | McKee et al. |
| 5,994,673 A | 11/1999 | El-Shoubary |

(56) References Cited

U.S. PATENT DOCUMENTS

| | | |
|---|---|---|
| 6,008,483 A | 12/1999 | McKee et al. |
| 6,031,208 A | 2/2000 | Witt et al. |
| 6,049,066 A | 4/2000 | Wilson |
| 6,058,924 A | 5/2000 | Pool, III et al. |
| 6,060,701 A | 5/2000 | McKee et al. |
| 6,064,050 A | 5/2000 | Ishikawa et al. |
| 6,079,321 A | 6/2000 | Harter et al. |
| 6,111,224 A | 8/2000 | Witt |
| 6,116,895 A | 9/2000 | Onuschak |
| 6,140,619 A | 10/2000 | Couch |
| 6,140,626 A | 10/2000 | McKee et al. |
| 6,146,678 A | 11/2000 | Caridis et al. |
| 6,175,099 B1 | 1/2001 | Shei et al. |
| 6,192,877 B1 | 2/2001 | Moshonas et al. |
| 6,218,650 B1 | 4/2001 | Tsukamoto et al. |
| 6,252,201 B1 | 6/2001 | Nevarez |
| 6,259,064 B1 | 7/2001 | Wilson |
| 6,262,394 B1 | 7/2001 | Shei et al. |
| 6,262,396 B1 | 7/2001 | Witt et al. |
| 6,262,406 B1 | 7/2001 | McKee et al. |
| 6,320,165 B1 | 11/2001 | Ovadia |
| 6,323,462 B1 | 11/2001 | Strand |
| 6,350,965 B2 | 2/2002 | Fukushima et al. |
| 6,359,271 B1 | 3/2002 | Gidner et al. |
| 6,376,817 B1 | 4/2002 | McFadden et al. |
| 6,378,602 B2 | 4/2002 | Brown |
| 6,384,381 B2 | 5/2002 | Witt et al. |
| 6,399,930 B2 | 6/2002 | Day et al. |
| 6,403,937 B1 | 6/2002 | Day et al. |
| 6,425,388 B1 | 7/2002 | Korinchock |
| 6,441,355 B2 | 8/2002 | Thorneywork |
| 6,455,085 B1 | 9/2002 | Duta |
| 6,476,368 B2 | 11/2002 | Aronsson et al. |
| 6,486,455 B1 | 11/2002 | Merabet |
| 6,494,130 B2 | 12/2002 | Brown |
| 6,517,882 B2 | 2/2003 | Elia et al. |
| 6,526,961 B1 | 3/2003 | Hardenburger |
| 6,528,773 B2 | 3/2003 | Kim et al. |
| 6,534,688 B2 | 3/2003 | Klausmeyer |
| 6,539,934 B2 | 4/2003 | Moshonas et al. |
| 6,541,739 B2 | 4/2003 | Shei et al. |
| 6,552,305 B2 | 4/2003 | De'Longhi |
| 6,576,874 B2 | 6/2003 | Zapata et al. |
| 6,592,364 B2 | 7/2003 | Zapata |
| 6,595,117 B1 | 7/2003 | Jones et al. |
| 6,614,007 B1 | 9/2003 | Reay |
| 6,655,373 B1 | 12/2003 | Wiker |
| 6,660,982 B2 | 12/2003 | Thorneywork |
| 6,692,788 B1 | 2/2004 | Mottram et al. |
| 6,693,261 B2 | 2/2004 | Leutner |
| 6,712,063 B1 | 3/2004 | Thorneywork |
| 6,712,064 B2 | 3/2004 | Stacy et al. |
| 6,716,467 B2 | 4/2004 | Cole et al. |
| 6,805,112 B2 | 10/2004 | Cole et al. |
| 6,817,201 B2 | 11/2004 | Yingst |
| 6,817,283 B2 | 11/2004 | Jones et al. |
| 6,818,869 B2 | 11/2004 | Patti et al. |
| 6,833,032 B1 | 12/2004 | Douglas et al. |
| 6,833,533 B1 | 12/2004 | Wolfe et al. |
| 6,869,538 B2 | 3/2005 | Yu et al. |
| 6,874,495 B2 | 4/2005 | McFadden |
| 6,880,545 B2 | 4/2005 | Heber et al. |
| 6,903,318 B2 | 6/2005 | Thorneywork |
| 6,914,221 B1 | 7/2005 | Witt et al. |
| 6,933,472 B1 | 8/2005 | Smith et al. |
| 6,933,473 B2 | 8/2005 | Henke et al. |
| 6,934,690 B1 | 8/2005 | Van Horn et al. |
| 6,943,321 B2 | 9/2005 | Carbone et al. |
| 6,968,565 B1 | 11/2005 | Slaney et al. |
| 7,019,272 B2 | 3/2006 | Braunisch et al. |
| 7,055,518 B2 | 6/2006 | McFadden et al. |
| 7,082,941 B2 | 8/2006 | Jones et al. |
| 7,087,872 B1 | 8/2006 | Dobie et al. |
| 7,105,779 B2 | 9/2006 | Shei |
| 7,192,272 B2 | 3/2007 | Jones et al. |
| 7,196,291 B2 * | 3/2007 | Cothran ............... F24C 7/06 219/393 |
| 7,220,946 B2 | 5/2007 | Majchrzak |
| 7,227,102 B2 | 6/2007 | Shei |
| 7,326,882 B2 | 2/2008 | Faries, Jr. et al. |
| 7,328,654 B2 | 2/2008 | Shei |
| 7,328,695 B2 | 2/2008 | Tatsumu et al. |
| 7,329,847 B2 | 2/2008 | Tatsumu et al. |
| 7,343,912 B2 | 3/2008 | Jones et al. |
| 7,360,533 B2 | 4/2008 | McFadden |
| RE40,290 E | 5/2008 | Shei et al. |
| 7,370,647 B2 | 5/2008 | Thorneywork |
| 7,424,848 B2 | 9/2008 | Jones et al. |
| 7,435,931 B1 | 10/2008 | McKee et al. |
| 7,446,282 B2 | 11/2008 | Shei et al. |
| 7,468,495 B2 | 12/2008 | Carbone et al. |
| 7,480,627 B1 | 1/2009 | Van Horn et al. |
| 7,493,362 B2 | 2/2009 | Bogatin et al. |
| 7,507,938 B2 | 3/2009 | McFadden |
| 7,554,057 B2 | 6/2009 | Monny Dimouamoua |
| 7,575,000 B2 | 8/2009 | Jones et al. |
| 7,604,002 B2 | 10/2009 | Rabas et al. |
| 7,624,676 B2 | 12/2009 | Nishida et al. |
| 7,624,728 B1 | 12/2009 | Forbes |
| 7,781,702 B2 | 8/2010 | Nam et al. |
| 7,784,457 B2 | 8/2010 | Akdag et al. |
| 7,792,920 B2 | 9/2010 | Istvan et al. |
| 7,793,586 B2 | 9/2010 | Rabas |
| 7,825,358 B2 | 11/2010 | Kim |
| 7,836,874 B2 | 11/2010 | McFadden |
| 7,836,875 B2 | 11/2010 | McFadden et al. |
| 7,884,306 B2 | 2/2011 | Leach |
| 7,886,658 B2 | 2/2011 | McFadden et al. |
| 7,900,228 B2 | 3/2011 | Stark et al. |
| 7,905,173 B2 | 3/2011 | Sus et al. |
| 7,910,866 B2 | 3/2011 | Hwang et al. |
| 7,921,841 B2 | 4/2011 | McKee et al. |
| 7,941,819 B2 | 5/2011 | Stark et al. |
| 7,942,278 B2 | 5/2011 | Martin et al. |
| 7,946,224 B2 | 5/2011 | McFadden |
| 7,956,304 B2 | 6/2011 | Bacigalupe et al. |
| 8,006,685 B2 | 8/2011 | Bolton et al. |
| 8,011,293 B2 | 9/2011 | McFadden et al. |
| 8,029,274 B2 | 10/2011 | Jones et al. |
| 8,035,062 B2 | 10/2011 | McFadden et al. |
| 8,035,065 B2 | 10/2011 | Kim et al. |
| 8,042,533 B2 | 10/2011 | Dobie et al. |
| 8,047,128 B2 | 11/2011 | Salvaro |
| 8,058,590 B2 | 11/2011 | Thorneywork et al. |
| 8,058,594 B2 | 11/2011 | Hwang |
| 8,063,342 B2 | 11/2011 | Hines, Jr. |
| 8,071,922 B2 | 12/2011 | Claesson et al. |
| 8,093,538 B2 | 1/2012 | Claesson et al. |
| 8,113,190 B2 | 2/2012 | Dougherty |
| 8,124,200 B2 | 2/2012 | Quella et al. |
| 8,134,101 B2 | 3/2012 | Majchrzak |
| 8,134,102 B2 | 3/2012 | McKee et al. |
| 8,136,442 B2 | 3/2012 | Strutin-Belinoff et al. |
| 8,143,560 B2 | 3/2012 | Park et al. |
| 8,164,036 B2 | 4/2012 | Lee |
| 8,168,928 B2 | 5/2012 | Kim et al. |
| 8,210,844 B2 | 7/2012 | Wolfe et al. |
| 8,212,188 B2 | 7/2012 | Kim et al. |
| 8,218,955 B2 | 7/2012 | Witt |
| 8,224,892 B2 | 7/2012 | Bogatin et al. |
| 8,253,084 B2 | 8/2012 | Toyoda et al. |
| 8,258,440 B2 | 9/2012 | Shei et al. |
| 8,292,494 B2 | 10/2012 | Rosa et al. |
| 8,297,270 B2 | 10/2012 | McFadden |
| 8,304,702 B2 | 11/2012 | Kim |
| 8,338,756 B2 | 12/2012 | Shei et al. |
| 8,359,351 B2 | 1/2013 | Istvan et al. |
| 8,378,265 B2 | 2/2013 | Greenwood et al. |
| 8,389,907 B2 | 3/2013 | Willett |
| 8,399,812 B2 | 3/2013 | Thorneywork et al. |
| 8,490,475 B2 | 7/2013 | Dejmek et al. |
| 8,546,359 B2 * | 10/2013 | Caldwell ............... A61K 31/135 514/114 |
| 8,561,321 B2 | 10/2013 | Inoue et al. |

(56) References Cited

U.S. PATENT DOCUMENTS

| | | |
|---|---|---|
| 8,586,900 B2 | 11/2013 | Kim et al. |
| 8,637,792 B2 | 1/2014 | Agnello et al. |
| 8,658,953 B2 | 2/2014 | McFadden et al. |
| 8,680,439 B2 | 3/2014 | Shei et al. |
| 8,680,449 B2 | 3/2014 | Kim |
| 8,695,487 B2 | 4/2014 | Sakane et al. |
| 8,707,945 B2 | 4/2014 | Hasslberger et al. |
| 8,733,236 B2 | 5/2014 | McKee |
| 8,735,778 B2 | 5/2014 | Greenwood et al. |
| 8,746,134 B2 | 6/2014 | McKee |
| 8,893,705 B2 | 11/2014 | McFadden |
| 8,895,902 B2 | 11/2014 | Shei et al. |
| 8,941,041 B2 | 1/2015 | Lee |
| 8,968,848 B2 | 3/2015 | Quella et al. |
| 8,991,383 B2 | 3/2015 | Johnson |
| 8,993,945 B2 | 3/2015 | McKee et al. |
| 9,074,776 B2 | 7/2015 | Greenwood et al. |
| 9,074,777 B2 | 7/2015 | Catalogne et al. |
| 9,134,033 B2 | 9/2015 | Nevarez et al. |
| 9,157,639 B2 | 10/2015 | Gallici et al. |
| 9,161,547 B2 | 10/2015 | McKee |
| RE45,789 E | 11/2015 | Shei et al. |
| 9,265,400 B2 | 2/2016 | Bigott |
| 9,277,598 B2 | 3/2016 | Lee et al. |
| 9,288,997 B2 | 3/2016 | McKee |
| 9,301,646 B2 | 4/2016 | Rosa et al. |
| 9,303,879 B2 | 4/2016 | Price et al. |
| 9,326,639 B2 | 5/2016 | McKee et al. |
| 9,341,382 B2 | 5/2016 | Kim |
| 9,351,495 B2 | 5/2016 | McFadden |
| 9,372,006 B2 | 6/2016 | McKee et al. |
| 9,474,284 B2 | 10/2016 | Dougherty |
| 9,480,364 B2 | 11/2016 | McKee et al. |
| 9,516,704 B2 | 12/2016 | Stanger |
| 2001/0025842 A1 | 10/2001 | Witt et al. |
| 2002/0003140 A1 | 1/2002 | Day et al. |
| 2002/0134778 A1 | 9/2002 | Day et al. |
| 2003/0141296 A1 | 7/2003 | Thorneywork |
| 2004/0026401 A1 | 2/2004 | Jones et al. |
| 2004/0163635 A1 | 8/2004 | Thorneywork |
| 2005/0000957 A1 | 1/2005 | Jones et al. |
| 2005/0045173 A1 | 3/2005 | Heber et al. |
| 2005/0077281 A1* | 4/2005 | Hamilton ............ F27B 17/00 219/392 |
| 2005/0173397 A1 | 8/2005 | Majchrzak et al. |
| 2005/0205547 A1 | 9/2005 | Wenzel |
| 2005/0211109 A1 | 9/2005 | Majchrzak et al. |
| 2005/0258171 A1 | 11/2005 | Witt |
| 2006/0020962 A1 | 1/2006 | Stark et al. |
| 2006/0026636 A1 | 2/2006 | Stark et al. |
| 2006/0026638 A1 | 2/2006 | Stark et al. |
| 2006/0031880 A1 | 2/2006 | Stark et al. |
| 2006/0041927 A1 | 2/2006 | Stark et al. |
| 2006/0064720 A1 | 3/2006 | Istvan et al. |
| 2006/0080408 A1 | 4/2006 | Istvan et al. |
| 2006/0085825 A1 | 4/2006 | Istvan et al. |
| 2006/0085835 A1 | 4/2006 | Istvan et al. |
| 2006/0102017 A1 | 5/2006 | Rabas et al. |
| 2006/0201495 A1 | 9/2006 | Jones et al. |
| 2007/0092670 A1 | 4/2007 | Quella et al. |
| 2007/0108179 A1 | 5/2007 | Hines, Jr. |
| 2007/0125319 A1 | 6/2007 | Jones et al. |
| 2007/0210064 A1 | 9/2007 | Quella et al. |
| 2008/0008795 A1 | 1/2008 | Thorneywork et al. |
| 2008/0092754 A1 | 4/2008 | Noman |
| 2008/0105133 A1 | 5/2008 | McFadden et al. |
| 2008/0105136 A1 | 5/2008 | McFadden |
| 2008/0105249 A1 | 5/2008 | McFadden et al. |
| 2008/0106483 A1 | 5/2008 | McFadden et al. |
| 2008/0127833 A1 | 6/2008 | Lee |
| 2008/0134903 A1 | 6/2008 | Kim et al. |
| 2008/0148961 A1 | 6/2008 | Hwang et al. |
| 2008/0148963 A1 | 6/2008 | Kim et al. |
| 2008/0149628 A1 | 6/2008 | Thorneywork et al. |
| 2008/0149630 A1 | 6/2008 | Hwang |
| 2008/0149631 A1 | 6/2008 | Lee |
| 2008/0149632 A1 | 6/2008 | Kim et al. |
| 2008/0149633 A1 | 6/2008 | Kim |
| 2008/0156202 A1 | 7/2008 | Park et al. |
| 2008/0245359 A1 | 10/2008 | Williamson |
| 2008/0296284 A1 | 12/2008 | McFadden et al. |
| 2008/0302253 A1 | 12/2008 | Salvaro |
| 2009/0095727 A1 | 4/2009 | Majchrzak |
| 2009/0139367 A1 | 6/2009 | Rosa et al. |
| 2009/0142719 A1 | 6/2009 | Scheuring, III et al. |
| 2009/0165778 A1 | 7/2009 | Harter et al. |
| 2009/0222612 A1 | 9/2009 | Thorneywork et al. |
| 2010/0000509 A1 | 1/2010 | Babington |
| 2010/0031193 A1 | 2/2010 | Stark et al. |
| 2010/0054717 A1 | 3/2010 | Lee et al. |
| 2010/0058936 A1 | 3/2010 | Schjerven, Sr. et al. |
| 2010/0126979 A1 | 5/2010 | Willett |
| 2010/0133263 A1 | 6/2010 | Toyoda et al. |
| 2010/0166398 A1 | 7/2010 | Witt |
| 2010/0320198 A1 | 12/2010 | Kim |
| 2010/0320199 A1 | 12/2010 | Kim |
| 2010/0326290 A1 | 12/2010 | Gallici et al. |
| 2010/0332994 A1 | 12/2010 | Istvan et al. |
| 2011/0005409 A1 | 1/2011 | Majchrzak |
| 2011/0083657 A1 | 4/2011 | Ploof et al. |
| 2011/0126818 A1 | 6/2011 | Behle et al. |
| 2012/0017770 A1 | 1/2012 | Sakane et al. |
| 2012/0021100 A1 | 1/2012 | Thorneywork et al. |
| 2012/0067226 A1 | 3/2012 | Claesson et al. |
| 2012/0118875 A1 | 5/2012 | Jussel |
| 2012/0138597 A1 | 6/2012 | Quella et al. |
| 2012/0187115 A1 | 7/2012 | Toyoda et al. |
| 2012/0192725 A1 | 8/2012 | Toyoda et al. |
| 2012/0248095 A1 | 10/2012 | Lee et al. |
| 2012/0328752 A1 | 12/2012 | Green et al. |
| 2013/0004630 A1 | 1/2013 | McFadden |
| 2013/0175253 A1 | 7/2013 | Shei et al. |
| 2013/0220296 A1 | 8/2013 | Catalogne et al. |
| 2013/0255657 A1 | 10/2013 | Schootstra et al. |
| 2013/0306052 A1 | 11/2013 | Price et al. |
| 2013/0306616 A1 | 11/2013 | Wildebush |
| 2014/0026764 A1 | 1/2014 | Sykes et al. |
| 2014/0048055 A1 | 2/2014 | Ruther |
| 2014/0083309 A1 | 3/2014 | Reese et al. |
| 2014/0099420 A1 | 4/2014 | Petronio et al. |
| 2014/0116268 A1 | 5/2014 | Bigott et al. |
| 2014/0137852 A1 | 5/2014 | Radford et al. |
| 2014/0161952 A1 | 6/2014 | Sykes |
| 2014/0161953 A1 | 6/2014 | Jones et al. |
| 2014/0174426 A1 | 6/2014 | Moon et al. |
| 2014/0202444 A1 | 7/2014 | Dobie |
| 2014/0216267 A1 | 8/2014 | McKee |
| 2014/0217083 A1 | 8/2014 | McKee |
| 2014/0231407 A1 | 8/2014 | Kantas |
| 2014/0261373 A1 | 9/2014 | Yingst et al. |
| 2014/0290003 A1 | 10/2014 | Mick et al. |
| 2014/0318387 A1 | 10/2014 | Kim |
| 2014/0322417 A1 | 10/2014 | Kim |
| 2014/0326710 A1 | 11/2014 | McKee et al. |
| 2015/0047514 A1 | 2/2015 | Abe et al. |
| 2016/0050939 A1 | 2/2016 | Riggle et al. |
| 2016/0066585 A1 | 3/2016 | Lago |
| 2016/0273843 A1 | 9/2016 | Wenzel |
| 2016/0327278 A1 | 11/2016 | McKee et al. |
| 2016/0345592 A1 | 12/2016 | McKee et al. |
| 2016/0348920 A1 | 12/2016 | Yingst et al. |
| 2016/0356504 A1 | 12/2016 | McKee et al. |
| 2016/0356505 A1 | 12/2016 | McKee et al. |
| 2016/0356506 A1 | 12/2016 | McKee et al. |
| 2017/0010003 A1 | 1/2017 | Dougherty |

FOREIGN PATENT DOCUMENTS

| | | |
|---|---|---|
| EP | 1624255 A1 | 2/2006 |
| EP | 1672284 A1 | 6/2006 |
| EP | 1732359 A2 | 12/2006 |
| EP | 2735806 A1 | 5/2014 |
| WO | 0064219 A1 | 10/2000 |
| WO | 2005023006 A2 | 3/2005 |

(56) References Cited

FOREIGN PATENT DOCUMENTS

| WO | 2012/062679 A1 | 5/2012 |
|---|---|---|
| WO | 2015101399 A1 | 7/2015 |
| WO | 2015/175366 A1 | 11/2015 |

OTHER PUBLICATIONS

Written Opinion of International Searching Authority for PCT/US2016/030718 dated Jul. 27, 2016.
Charlotte Atchley, Uniting Technologies, dated Feb. 1, 2015. See http://www.bakingbusiness.com/Features/Operations/2015/2/Uniting%20Technologies.aspx?cck=1.
Multi-zone Temperature & Time Controller (TC10263). See http://www.degreec.com/en/application-overview/food-equipment/multizone-thermal-controller-tc10263.html (last visited Jun. 8, 2015).
International Search Report for PCT/US2016/030736 dated Aug. 4, 2016.
Written Opinion of International Searching Authority for PCT/US2016/030736 dated Aug. 4, 2016.
International Search Report for PCT/US2016/030778 dated Aug. 4, 2016.
Written Opinion of International Searching Authority for PCT/US2016/030778 dated Aug. 4, 2016.

\* cited by examiner

MULTI-ZONE OVEN WITH VARIABLE CAVITY SIZES

FIELD OF INVENTION

The present invention relates to cooking ovens in general, and in particular to a convection oven having removable air plenums.

BACKGROUND OF THE INVENTION

An oven generally includes an oven cavity configured to receive food articles for cooking. The oven also includes a heating element, which can be an electric resistance element or a gas burner, for generating heat energy to cook any food items placed within an oven cavity. Some ovens may include a fan for forcing movement of heated air within the oven cavity, and those ovens are commonly referred to as convection ovens.

Convection ovens have been the workhorse in commercial kitchens for many decades. Commercial convection ovens generally come in two sizes, namely, full-size and half-size. Full-sized commercial convection ovens are designed to fit within the space of an industry standard footprint, which is approximately 40 inches wide by 40 inches deep, made available for full-sized convection ovens in most commercial kitchens. The oven cavity of full-sized commercial ovens are also dimensioned to accept industry standard full-sized cooking trays, which are approximately 26 inches wide by 18 inches deep. The height of the cook cavity is typically about 20 inches, which is capable of being configured to allow for multiple rack heights, such as 11 possible rack heights, to accommodate the height of various foods that can be cooked in a convection oven. For example, only 2 racks may be placed in a commercial convection oven if 9-inch tall turkeys are being cooked, but 4 to 5 racks may be evenly spaced from top to bottom when that many racks of 2-inch tall lasagna are being cooked. Half-sized commercial convection ovens are similarly configured and dimensioned to fit into industry standard half-sized spaces in commercial kitchens and to receive industry standard half-sized sheet pans.

When cooking in a typical convection oven, heated air within the oven cavity is circulated by a fan. The fan initiates a flow of heated air by pulling air from the oven cavity through multiple openings on a back wall of the oven cavity. The heated air then exits other openings on the side walls of the oven cavity. The heated air moves through the oven cavity to help distribute heat energy to food articles placed within the oven cavity. An example of the heating system of a typical convection oven can be found in U.S. Pat. No. 4,395,233 to Smith et al.

One problem with the heating system of a conventional convection oven is that it can generate regions of high and low speed air flow in the oven cavity such that the heated air is not uniformly distributed within the oven cavity. As a result, food items placed in the oven cavity may be cooked unevenly. For example, food items placed on different racks at different heights within the convection oven may be cooked at different rates. In addition, food items placed on the same rack may not receive uniform heating either. This unevenness of cooking can result in food waste, as food items located in the higher heat portions of the oven cavity can be unacceptably overdone as compared to the food items located in the lower heat portions. Unevenness of cooking can be partially overcome by rotating cook trays within the oven cavity, as well as utilizing reduced cooking temperatures and blower speeds, but doing so will increase skilled labor requirements as well as cook times.

Conventional convection ovens have other problems as well. For example, only one cook temperature and heat transfer profile, such as blower speed, can be delivered in a conventional convection oven at any one time, thereby limiting the types of foods that can be cooked simultaneously. This can be overcome by having multiple convection ovens set at different cook temperatures and heat transfer profiles, but doing so will result in space and energy inefficiency.

Consequently, it would be desirable to provide an improved convection oven that can eliminate the above-mentioned problems.

BRIEF DESCRIPTION OF THE DRAWINGS

The invention itself, as well as a preferred mode of use, further objects, and advantages thereof, will best be understood by reference to the following detailed description of illustrative and exemplary embodiments when read in conjunction with the accompanying drawings, wherein.

SUMMARY OF THE INVENTION

Figure 1:
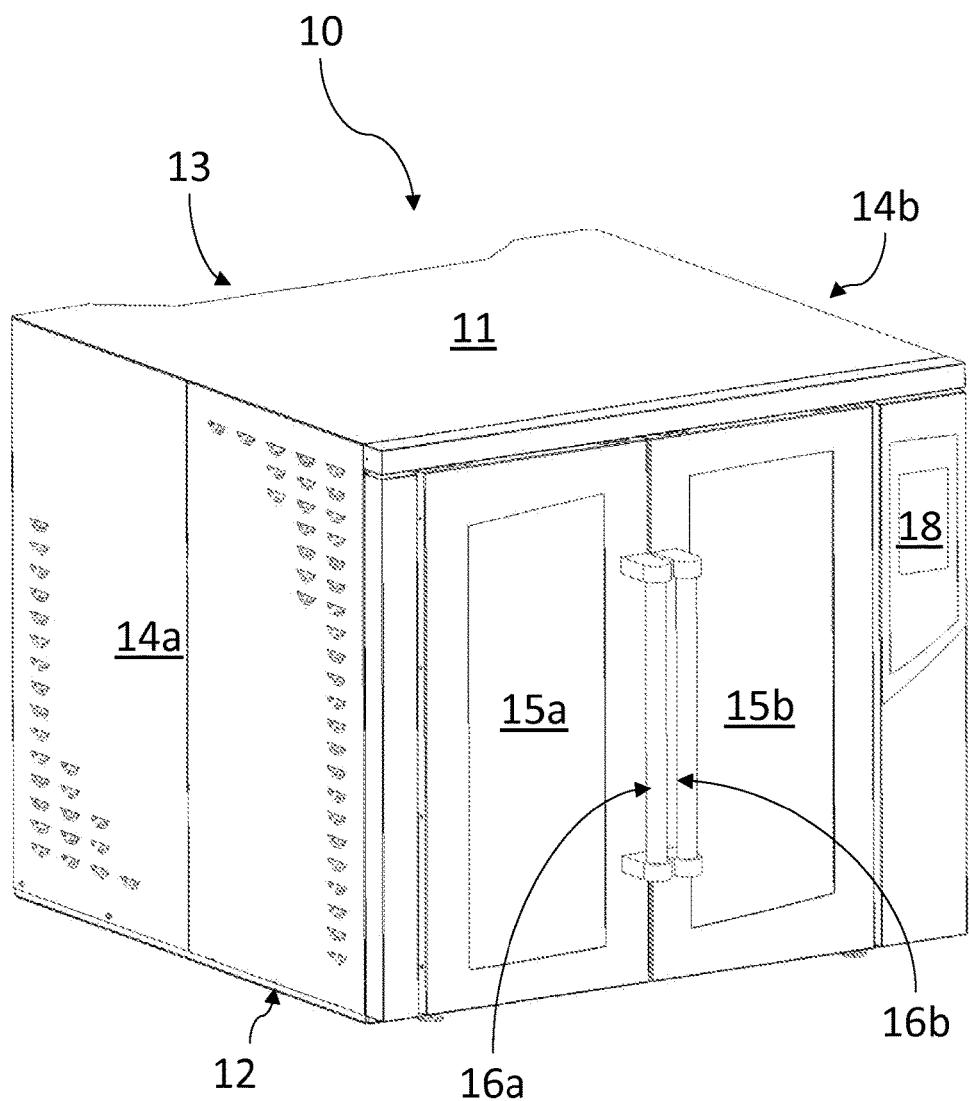
FIG. 1 is an isometric view of a convection oven, in accordance with an exemplary embodiment of the present invention.

It has now been found that the above and related objects of the present invention are obtained in the form of several related aspects, including a convection oven having removable air plenums.

In accordance with an exemplary embodiment of the present invention, a convection oven has one or more removable air plenums that can be placed within the oven cavity to divide the cavity into separate cooking chambers. Removable air plenums are connectable to and engageable with air channels of the oven. Each removable air plenum includes an air intake edge for receiving heated air from the engaged air channel in the oven and a plurality of air vents for directing the heated air into the corresponding cooking chamber for the purpose of heating any food items located within the cooking chamber. When a removable air plenum is disengaged from the oven air channel and removed from the oven cavity, the air channel is covered by a flap.

By placing, removing, or re-arranging removable air plenums within the oven cavity, one can arrange to have different number of cooking chambers with variable heights in the convection oven to meet multiple cooking needs simultaneously. The oven may be provided with a control panel that can control each cooking chamber independently.

The oven may have one or two oven doors for accessing all of the cooking chambers. In other words, the size of the oven door(s) is not dependent on the height of cooking chambers defined by the removable air plenums.

The oven may also have a sensor for detecting the opening of oven doors during a cook cycle. To compensate for any disruption to the cook cycle due to the opened oven door, the oven's controller may extend the cooking time(s) or re-adjust cooking parameters for the cooking chamber(s) based on the measured amount of time the oven doors were kept open during their respective cook cycles.

The present invention also relates to a convection oven comprising a housing having an oven cavity and an oven door for access to the oven cavity, at least one air blower for generating heated air, one or more air channels for directing the heated air from the air blower toward the oven cavity, and one or more removable air plenums, wherein each of the one or more removable air plenums is connected to one of the one or more air channels; comprises an air intake edge for receiving the heated air from the one of the one or more air channels; defines the top or the bottom of a cooking chamber within the oven cavity; and comprises a plurality of air vents for directing the heated air into the cooking chamber.

In at least one embodiment, at least one of the one or more air channels is coverable by a flap if not connected to one of the one or more removable air plenums.

In at least one embodiment, at least one of the one or more removable air plenums comprises a tab configured to open the flap when connected to one of the one or more air channels.

In at least one embodiment, the convection oven further comprises a control panel for separately and independently controlling each of the cooking chambers defined by the one or more removable air plenums.

In at least one embodiment, the convection oven further comprises a sensor for detecting the oven door being kept opened during a cook cycle.

In at least one embodiment, the convection oven further comprises a controller for re-adjusting a cooking parameter for at least one of the cooking chambers defined by the one or more removable air plenums based on the amount of time the oven door is kept opened during the cook cycle.

In at least one embodiment, at least one of the one or more removable air plenums is configured to direct the heated air upward.

In at least one embodiment, at least one of the one or more removable air plenums is configured to direct the heated air downward.

In at least one embodiment, at least one of the one or more removable air plenums is configured to support a food rack within the corresponding cooking chamber.

All features and advantages of the present invention will become apparent in the following detailed written description.

DETAILED DESCRIPTION OF PREFERRED EMBODIMENTS

Referring now to the drawings and in particular to FIG. 1, there is depicted an isometric view of a convection oven, in accordance with an exemplary embodiment of the present invention. As shown, a convection oven 10 includes a housing having a top panel 11, a bottom panel 12, a rear panel 13 and two side panels 14a, 14b.

A pair of oven doors 15a, 15b may form the front panel of the housing and are pivotally connected with side panels 14a, 14b, respectively, via hinges. Oven doors 15a and 15b may include handles 16a and 16b, respectively, for opening and closing the same, and a latch may be provided to keep doors 15a, 15b in a closed position. Door sensing switches (not shown) may be placed so as to sense when doors 15a, 15b are being opened or closed.

In alternative embodiments, instead of a pair of oven doors, the oven may include a single oven door which is pivotally connected with one of side panels 14a, 14b, top panel 11, or bottom panel 12 via hinges.

Convection oven 10 also includes a control panel 18. For example, control panel 18 may be implemented with touch-screen technology. An operator can enter commands or cooking parameters, such as cooking temperature, cooking time, fan speed, etc., via control panel 18 to effectuate cooking controls on any food items placed within convection oven 10.

Figure 2A:
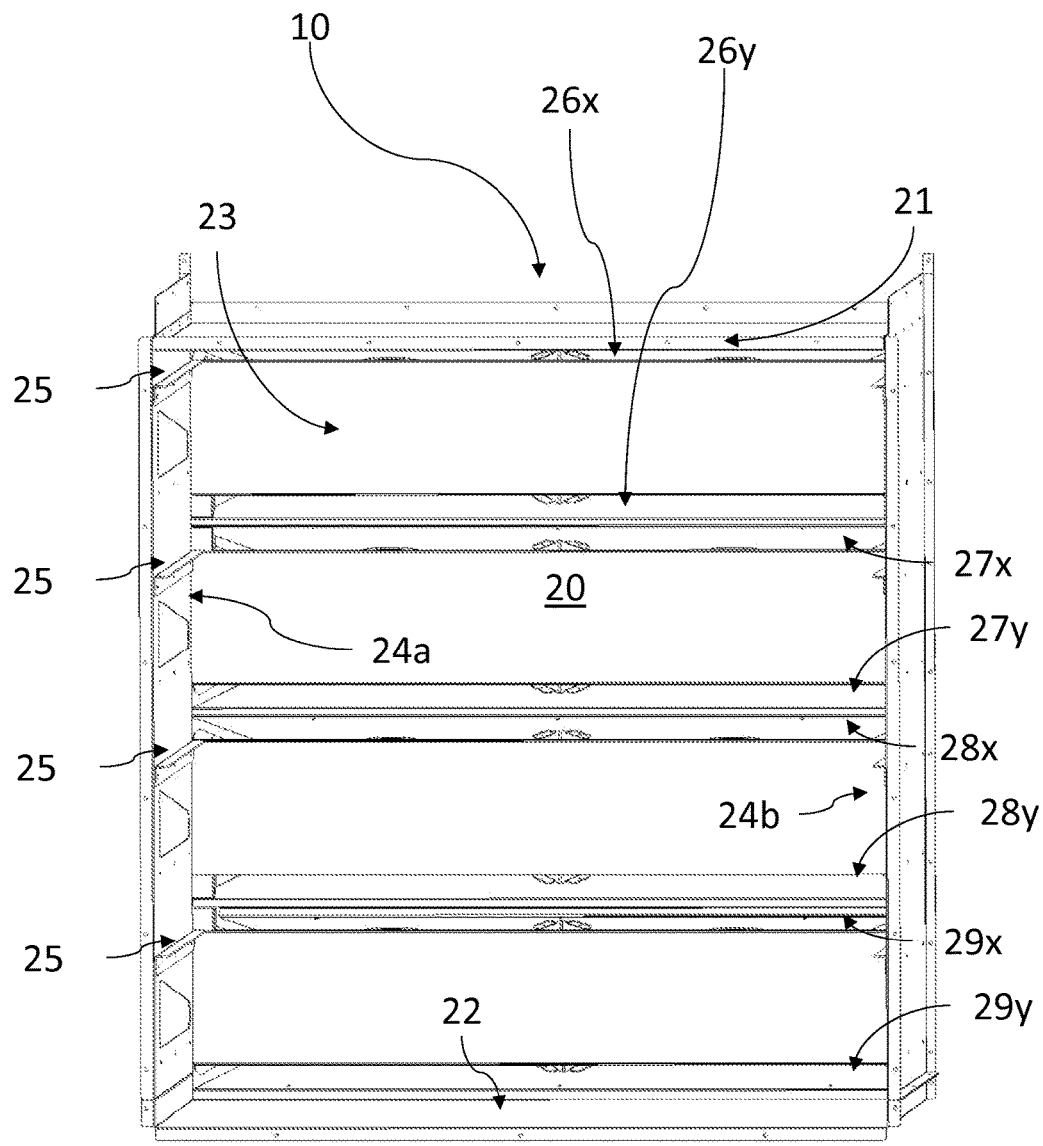
FIG. 2A is a front view of an oven cavity within the convection oven from FIG. 1, in accordance with an exemplary embodiment of the present invention.

With reference now to FIG. 2A, there is depicted a front view of the oven cavity 20 within convection oven 10, in accordance with an exemplary embodiment of the present invention. As shown, an oven cavity 20 is defined by a top wall 21, a bottom wall 22, a rear wall 23, and side walls 24a, 24b along with doors 15a, 15b (shown in FIG. 2B). Located on side walls 24a, 24b are multiple parallel rails 25 (e.g., four rails shown in FIG. 2A) configured to support one or more removable air plenums, which may also serve as food rack supports, to direct heated air flow.

Located on rear wall 23 are multiple sets of air channel pairs (e.g., four sets shown in FIG. 2A) for bringing hot air into oven cavity 20. For example, as shown in FIG. 2A, a first set of air channel pairs includes a top air channel 26x and a bottom air channel 26y, a second set of air channel pairs includes a top air channel 27x and a bottom air channel 27y, a third set of air channel pairs includes a top air channel 28x and a bottom air channel 28y, and a fourth set of air channel pairs includes a top air channel 29x and a bottom air channel 29y. Each of the four air channel pairs can separately and independently send heated air into oven cavity 20.

Figure 2B:
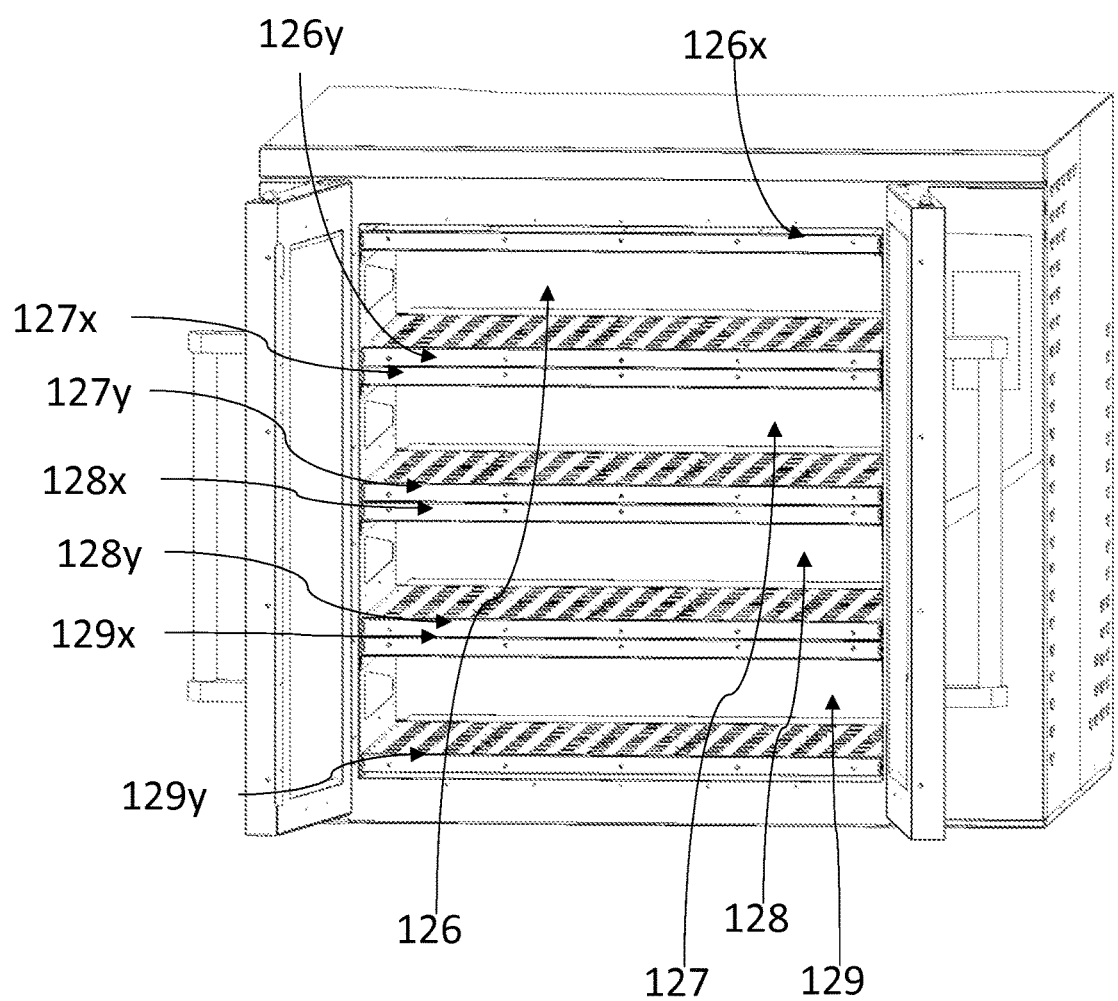
FIG. 2B is an isometric view of the oven cavity from FIG. 2A with multiple cooking chambers formed and defined by removable air plenums placed within the oven cavity.

In FIG. 2B, oven cavity 20 is shown to be populated with multiple removable air plenums 126x-129x and 126y-129y. These removable air plenums divide the oven cavity 20 into and define multiple (e.g., four in this case) cooking chambers 126, 127, 128, 129.

In accordance with an exemplary embodiment of the present invention, the multiple removable air plenums 126x-129x and 126y-129y may be all substantially identical to each other. In alternative embodiments, each or some of them may be configured differently.

In accordance with an exemplary embodiment shown in FIGS. 2A and 2B, removable air plenum 126x may be directly connected to and engaged with top air channel 26x; removable air plenum 126y may be directly connected to and engaged with bottom air channel 26y; removable air plenum 127x may be directly connected to and engaged with top air channel 27x; removable air plenum 127y may be directly connected to and engaged with bottom air channel 27y; removable air plenum 128x may be directly connected to and engaged with top air channel 28x; removable air plenum 128y may be directly connected to and engaged with bottom air channel 28y; removable air plenum 129x may be directly connected to and engaged with top air channel 29x; and removable air plenum 129y may be directly connected to and engaged with bottom air channel 29y. Removable air plenums 126x-129x and 126y-129y function to direct heated air from the corresponding air channels into the corresponding cooking chambers 126-129 formed within oven cavity 20 for the purpose of heating any food items located within each cooking chamber.

Figure 3:
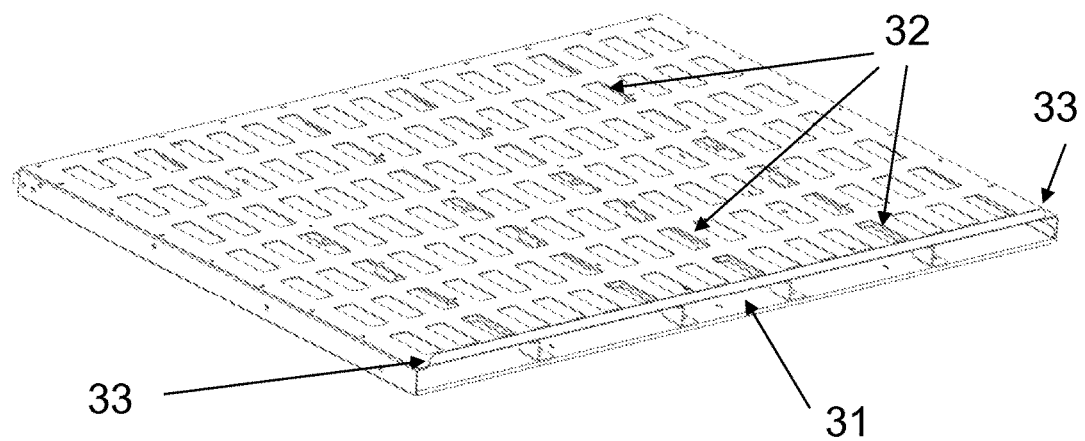
FIG. 3 is a detailed diagram of a removable air plenum from FIG. 2B.

Referring now to FIG. 3, there is depicted an exemplary embodiment of a removable air plenum 126y. As shown, removable air plenum 126y includes an air intake edge 31, multiple air vents 32 and a tab 33. Air intake edge 31 is configured to connect to an air channel 26y to receive heated air from the air channel. The heated air is then directed upward through air vents 32 into cooking chamber 126 within oven cavity 20 (from FIG. 2B). A tab 33 functions to open a flap (not shown) that covers air channel 26y when removable air plenum 126y is not connected to or engaged with air channel 26y.

Figure 4A:
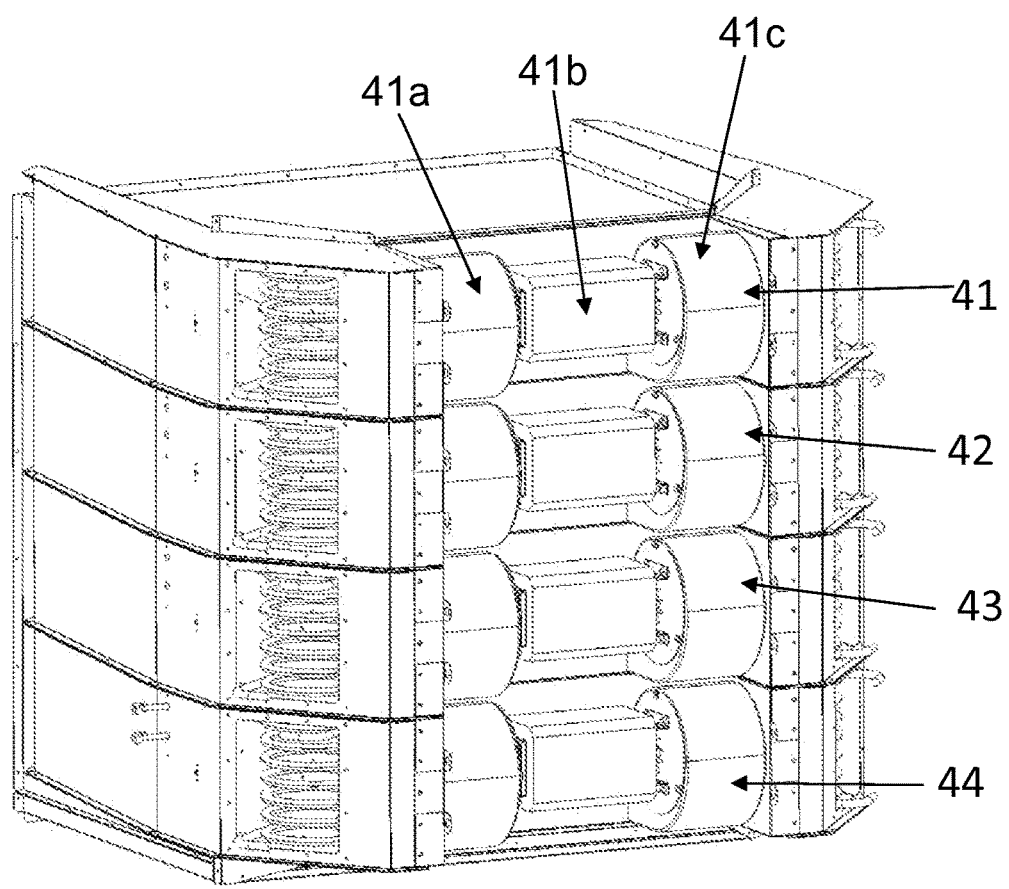
FIG. 4A shows a set of blower systems for the convection oven from FIG. 1.
Figure 4B:
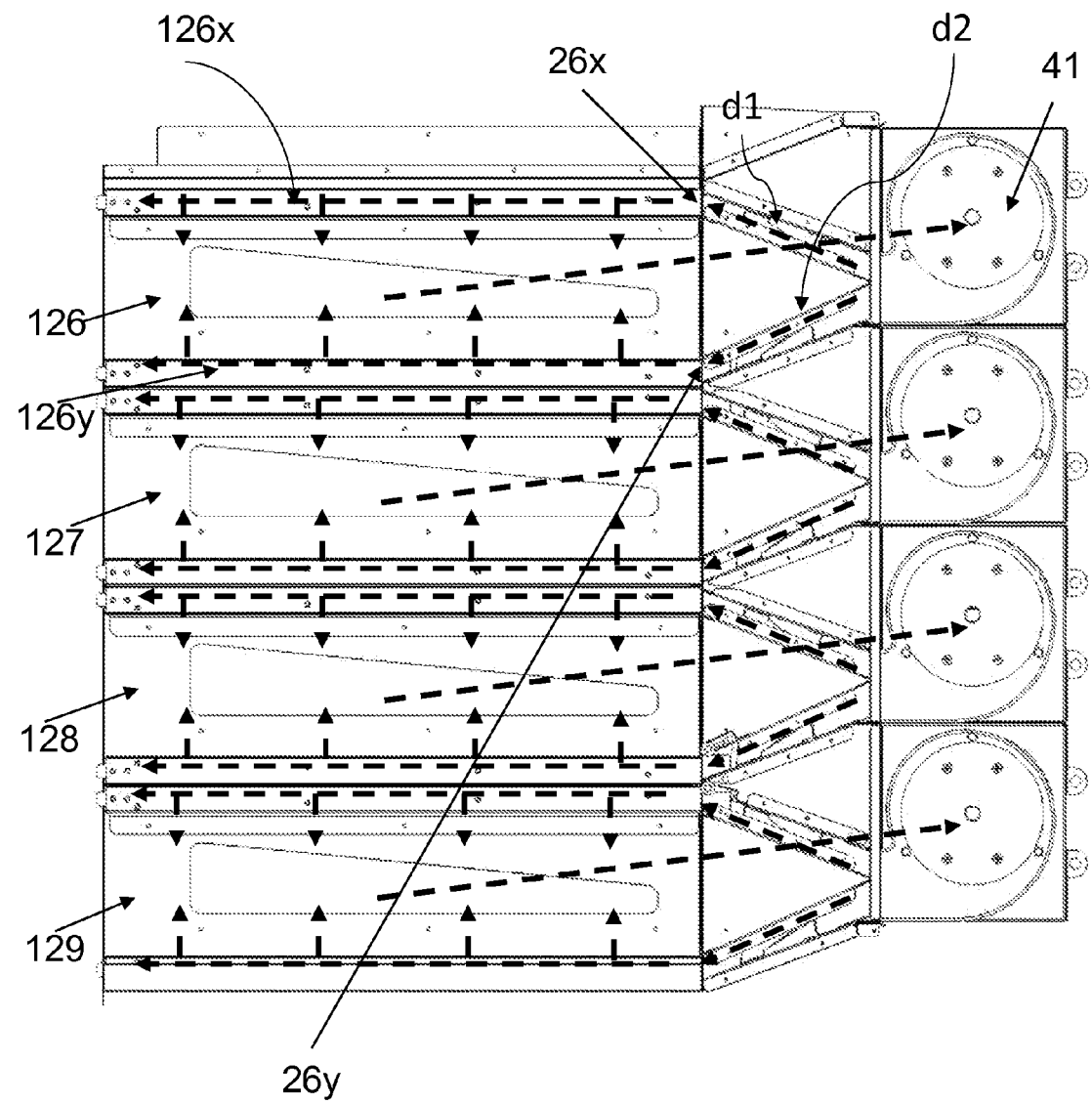
FIG. 4B is a cross-sectional side view of the convection oven from FIG. 1, depicting the various air paths within the oven cavity.

With reference now to FIGS. 4A-4B, there are depicted diagrams of a set of blower systems and the associated airflow path within convection oven 10 in accordance with an exemplary embodiment of the present invention. As shown, four blower systems 41-44 may be located at the rear of convection oven 10. Each of blower systems 41-44 may be equipped with its own heater and controlled independently of the other blower systems with respect to both temperature and/or blower speed. As an example, FIG. 4A shows that each of blower systems 41-44 is equipped with two blowers (e.g., 41a and 41c) which are driven by a single motor (e.g., 41b) placed between the two blowers.

In this exemplary embodiment, blower systems 41-44 may be substantially identical to each other in structure and generate similar airflow path. Hence, only blower system 41 will be further described below in details. In alternative embodiments, each or some of the blower systems may be differently configured.

As shown in FIG. 4B, blower system 41 sends heated air through diverters d1 and d2 that separate the heated air exiting blower system 41 into a top airstream and a bottom airstream. The top airstream from diverter d1 then travels through top air channel 26x and enters removable air plenum 126x where the heated air is channeled and directed to be substantially evenly disbursed in a downward direction into cooking chamber 126. Similarly, the bottom airstream from diverter d2 travels through bottom air channel 26y and enters removable air plenum 126y where the heated air is channeled and directed to be substantially evenly disbursed in an upward direction into cooking chamber 126. Once entering cooking chamber 126, the heated air comes into contact with any food item that is placed on one or more food racks (not shown) within cooking chamber 126. Afterwards, the air within the cooking chamber 126 may be drawn towards return air opening(s) on one or both sides of cooking chamber 126 and travels back to blower system 41.

Convectional oven 10 having a four-cooking chamber configuration (e.g., having four cooking chambers 126, 127, 128, 129), as shown in FIGS. 2B and 4B, can be easily transformed into, for example, a three-cooking chamber configuration, a two-cooking chamber configuration, or a one-cooking chamber configuration by simply removing some or all of the removable air plenums from oven cavity 20.

Figure 5:
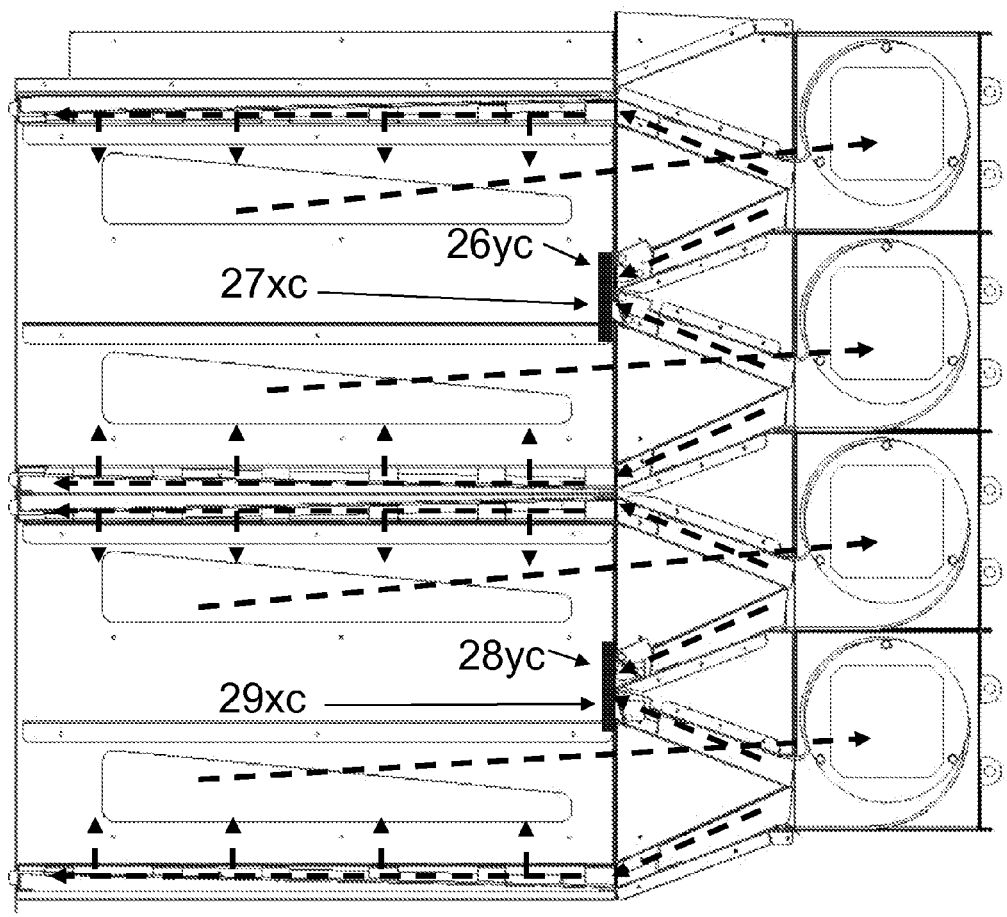
FIG. 5 depicts the air paths within the oven cavity when some of the removable air plenums are removed from the oven cavity.

Referring now to FIG. 5, there is illustrated the airflow of convection oven 10 in a two-cooking chamber configuration after air plenum 126y, air plenum 127x, air plenum 128y and air plenum 129x have been removed from oven cavity 20. After the removal of air plenums 126y and 127x, flaps 26yc and 27xc are activated (e.g., drop down) to cover air channels 26y and 27x, respectively. Similarly, after the removal of air plenums 128y and 129x, flaps 28yc and 29xc are activated (e.g., drop down) to cover air channels 28y and 29x, respectively. Flaps 26yc, 27xc, 28yc and 29xc may enable more heated air to be delivered through the remaining open air channels while also eliminating air entry from the back of oven cavity 20, which would introduce cooking unevenness between food located in the back and food located in the front of oven cavity 20.

In accordance with an exemplary embodiment of the present invention, each of flaps 26yc, 27xc, 28yc and 29xc may be automatically engaged when a tab 33 (from FIG. 3) is not in contact with a corresponding air channel. In other words, when no removable air plenum is connected to and engaged with an air channel (e.g., via tab 33), a flap automatically covers the air channel.

As described above, oven cavity 20 can be re-configured to have different numbers of cooking chambers with variable heights simply by re-arranging the location and the number of removable air plenums (such as a four-cooking chamber configuration shown in FIGS. 2B and 4B and a two-cooking chamber configuration shown in FIG. 5).

Whether in a two-cooking chamber configuration or a four-cooking chamber configuration, each of the cooking chambers within oven cavity 20 may be utilized to cook different food items (e.g., food items that require different cook times and/or different cooking temperature). Using a four-cooking chamber configuration as an example, each of the four cooking chambers can be independently managed by a corresponding one of blower systems 41-44. Specifically, cook times, temperatures, and blower speeds tailored for food items located in each of the four cooking chambers can be separately entered via a control panel, such as control panel 18 in FIG. 1, such that heated air directed to each of the four cooking chambers will be independently supplied from one of blower systems 41-44.

For example, biscuits may be placed in a first cooking chamber (e.g., cooking chamber 126) at 7:30 a.m. to cook for 15 minutes at 350° F. at a medium blower speed. Bacon strips may be placed in a second cooking chamber (e.g., cooking chamber 127) at 7:35 a.m. to cook for 5 minutes at 425° F. at a high blower speed. Pies may be placed in a third cooking chamber (e.g., cooking chamber 128) at about the same time as the bacon strips, but will be cooked for a longer time (e.g., 45 minutes) at a lower temperature (e.g., 325° F.) at a low blower speed. And cookies may be placed in a fourth cooking chamber (e.g., cooking chamber 129) at 7:40 a.m. to cook for 10 minutes at 400° F. at a medium blower speed. In this example, the bacon strips will be done at 7:40 a.m., the biscuits will be done at 7:45 a.m., cookies will be done at 7:50 a.m., and the pies will be done at 8:20 a.m., all using the same convection oven.

In the above example, oven doors (such as oven doors 15a and 15b from FIG. 1) are likely to be opened and closed multiple times while the various food items are in the process of being cooked for a predetermined time. Each time the oven doors are opened, the cooking process already in progress for the various cooking chambers will likely be disrupted. In order to compensate for this disruption, convection oven 10 may include a sensor for detecting opening of oven doors 15a and 15b during a cook cycle. The length of time that doors 15a and 15b are kept open may then be recorded and the cooking parameters for the various food items placed within different cooking chambers (e.g., cooking chambers 126, 127, 128, 129) may be re-adjusted based on the amount of time the oven doors are kept open during their respective cook cycles. For example, the cook times for the various food items placed in the various cooking chambers may be extended for an amount of time that is substantially identical or proportional to the amount of time the oven doors are kept open during their respective cook cycles.

As has been described, the present invention provides an improved convection oven providing a more uniform flow of heated air within the cooking chamber and also providing more flexibility for oven configurability.

While this invention has been described in conjunction with exemplary embodiments outlined above and illustrated in the drawings, it is evident that many alternatives, modifications and variations in form and detail will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A multi cavity air oven comprising:
   multiple cooking cavities, each cooking cavity including:
   (a) an upper plenum defining an upper wall for each given cooking cavity, the upper plenum receiving heated air through an upper air outlet from a wall of the cooking cavity to direct that heated air downwardly into the cooking cavity;
   (b) an air return communicating with the cooking cavity to receive return air after passing out of the upper plenum;
   (c) an air circulation system including passageways interconnecting the air outlet and air return of the cooking cavity;
   (d) a blower positioned to move air from the air return to the air outlet through the passageways;
   (e) a heater for heating the air of the cooking cavity;
   (f) a lower plenum defining a lower wall of each given cooking cavity, the lower plenum receiving heated air through a lower air outlet from a wall of the cooking cavity to direct that heated air upwardly into the cooking cavity;
   a controller independently controlling the heater of each cooking cavity to provide separate temperature control of each cooking cavity;
   wherein the air circulation systems of each cooking cavity are isolated from each other to provide separate air circulation within each cavity;
   wherein at least one upper plenum is movable to allow changing a size of at least one cooking cavity of the multiple cooking cavities; and
   wherein the lower plenum of a first cavity is movable with an upper plenum of a second cavity to allow changing of the size of the at least one cooking cavity.

2. The multi-cavity oven of claim 1 further including a food support surface positioned beneath the upper plenum wherein the upper plenum provides a series of jet orifices over a horizontal lower area of the upper plenum directing jets of air downward onto the food support surface.

3. The multi-cavity oven of claim 1 wherein the upper plenum is removable to change a size of the at least one cooking cavity by combining adjacent cooking cavities.

4. The multi-cavity oven of claim 3 further including an upper air outlet cover positionable over the upper air inlet cover when the upper plenum is removed to permit operation of the oven for cooking without the upper plenum without discharge of air through the upper air outlet cover into the cooking cavity.

5. The multi-cavity oven of claim 1 wherein the air circulation system includes passageways separately interconnecting the upper and lower air outlet and air return of each cooking cavity.

6. The multi-cavity oven of claim 1 further including a food support surface positioned above the lower plenum wherein the lower plenum provides a series of jet orifices over a horizontal upper area of the lower plenum directing jets of air upward into the food support surface.

7. The multi-cavity oven of claim 1 wherein the lower plenum is removable to change a size of a cooking cavity by combining adjacent cooking cavities with a removal of the lower plenum and an adjacent upper plenum.

8. The multi-cavity oven of claim 7 wherein including an air outlet cover covering upper and lower air outlets of the lower plenum and an adjacent upper plenum when they are removed to block airflow through the upper and lower air outlets.

9. The multi-cavity oven of claim 1 including at least three vertically arrayed cooking cavities providing two pairs of adjacent upper and lower plenums separating at least two adjacent cooking cavities.

10. The multi-cavity oven of claim 1 wherein each of the controller independently controls a blower speed of each blower of each cooking cavity to provide separate blower speeds for each cooking cavity.

11. The multi-cavity oven of claim 7 wherein the upper and lower plenums are identical plenums.

12. The multi-cavity oven of claim 7 wherein sidewalls of the cooking cavities include horizontal rails supporting the lower plenum and the upper plenum rests on the lower plenum.

13. The multi-cavity oven of claim 1 further including at least one oven door openable and closable to provide access to and to seal the multiple cooking cavities, wherein the controller independently controls the heater of each cooking cavity according to a time schedule and;
   wherein the controller adjusts the time schedule for the multiple cooking cavities to compensate for times that the oven door is open during the time schedule.

14. A convection oven comprising:
   a housing having an oven cavity and an oven door for access to the oven cavity;
   at least one air blower for generating heated air;
   one or more air channels for directing the heated air from the air blower toward the oven cavity; and
   one or more removable air plenums, wherein each of the one or more removable air plenums is configured to be removably connected to one of the one or more air channels; comprises an air intake edge for receiving the heated air from the one of the one or more air channels; defines a top or a bottom of a cooking chamber within the oven cavity when the removable air plenum is connected to the air channel; and comprises, on its top or bottom surface, a plurality of air vents for directing the heated air into the cooking chamber,
   wherein: the one or more air channels comprise a top air channel and a bottom air channel; the one or more removable air plenums comprise an upper removable air plenum removably connected to the top air channel and a lower removable air plenum removably connected to the bottom air channel; the upper removable air plenum defining the top of the cooking chamber within the oven cavity and comprising a plurality of air vents on its bottom surface to direct the heated air downward into the cooking chamber, and the lower removable air plenum defining the bottom of the cooking chamber within the oven cavity and comprising a plurality of air vents on its top surface to direct the heated air upward into the cooking chamber.

15. The convection oven of claim 14, further comprising a diverter to separate the heated air exiting from the air blower into a top airstream directed to the top air channel and a bottom air stream directed to the bottom air channel.

16. The convection oven of claim 14, further comprising a sensor for detecting the oven door being kept opened during a cook cycle.

17. The convection oven of claim 16, further comprising a controller for re-adjusting a cooking parameter for at least one of the cooking chambers defined by the one or more removable air plenums based on the amount of time the oven door is kept opened during the cook cycle.

18. The convection oven of claim 14, wherein the lower removable air plenum is configured to support a food rack within the corresponding cooking chamber.

19. The convection oven of claim 14, wherein the one or more air channels are located on a rear wall of the oven cavity.

20. The convection oven of claim 14, further comprising one or more pairs of parallel rails located on left and right side walls of the oven cavity to support the one or more removable air plenums.

21. The convection oven of claim 14, further comprising return air openings located on both left and right sides of the cooking chamber.

\* \* \* \* \*